US011615193B2

(12) United States Patent
Yared et al.

(10) Patent No.: US 11,615,193 B2
(45) Date of Patent: Mar. 28, 2023

(54) LOCALIZED DATA STORAGE AND PROCESSING

(71) Applicant: InCountry, Inc., Wilmington, DE (US)

(72) Inventors: Peter Yared, San francisco, CA (US); Marc Raiser, Coloma, MI (US)

(73) Assignee: InCountry, Inc., San Francisco, CA (US)

( * ) Notice: Subject to any disclaimer, the term of this patent is extended or adjusted under 35 U.S.C. 154(b) by 294 days.

(21) Appl. No.: 16/854,799

(22) Filed: Apr. 21, 2020

(65) Prior Publication Data

US 2020/0342119 A1 Oct. 29, 2020

Related U.S. Application Data

(60) Provisional application No. 62/837,524, filed on Apr. 23, 2019.

(51) Int. Cl.
| | |
|---|---|
| *G06F 21/60* | (2013.01) |
| *G06Q 50/26* | (2012.01) |
| *H04L 9/40* | (2022.01) |
| *H04L 9/06* | (2006.01) |
| *G06F 9/54* | (2006.01) |

(52) U.S. Cl.
CPC ............ *G06F 21/602* (2013.01); *G06F 9/54* (2013.01); *G06Q 50/265* (2013.01); *H04L 9/0631* (2013.01); *H04L 9/0643* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 2003/0028652 A1* | 2/2003 | Bardini | H04N 21/2541 375/E7.009 |
| 2003/0097576 A1* | 5/2003 | Dutta | G07B 17/00733 713/189 |
| 2012/0303776 A1 | 11/2012 | Ferris | |
| 2016/0267491 A1* | 9/2016 | Dale | G06Q 30/02 |
| 2017/0061559 A1* | 3/2017 | Ehrhardt | G06Q 50/18 |
| 2017/0344754 A1* | 11/2017 | Kumar | G06F 16/285 |

(Continued)

FOREIGN PATENT DOCUMENTS

KR 10-2017-0078983 7/2017

OTHER PUBLICATIONS

Paladi, Nicolae et al., "Trusted Geolocation-Aware Data Placement in Infrastructure Clouds", 2014 IEEE 13th International Conference on Trust, Security and Privacy in Computing and Communications, Sep. 24, 2014, pp. 352-360.

*Primary Examiner* — William J. Goodchild
(74) *Attorney, Agent, or Firm* — Raubvogel Law Office

(57) ABSTRACT

Data may be stored by receiving the data to be stored, determining whether the data is regulated in a jurisdiction, and, responsive to the determination, selecting between a regulated storage scheme, requiring that the data be stored and/or processed in the jurisdiction in accordance with one or more laws pertaining to the jurisdiction, and an unregulated storage scheme, in which the data is not required to be stored in the jurisdiction and/or is not required to be stored in accordance with the one or more laws. Further, the regulated storage scheme may be followed by initiating storage of the data in the jurisdiction in accordance with the one or more laws.

31 Claims, 13 Drawing Sheets

(56) References Cited

U.S. PATENT DOCUMENTS

| | | |
|---|---|---|
| 2018/0025168 A1 | 1/2018 | Roth et al. |
| 2018/0197145 A1 | 7/2018 | LaRowe et al. |
| 2019/0012278 A1* | 1/2019 | Sindhu ................ G06F 13/4282 |

* cited by examiner

LOCALIZED DATA STORAGE AND PROCESSING

CROSS-REFERENCE TO RELATED APPLICATION

The present application claims the benefit of U.S. Provisional Application Ser. No. 62/837,524 for "Localized Data Storage and Processing", filed Apr. 23, 2019, which is incorporated by reference herein in its entirety.

TECHNICAL FIELD

The present document relates to techniques for handling data storage and processing in compliance with regulations that can vary from one jurisdiction to another.

DESCRIPTION OF THE RELATED ART

Governments are increasingly regulating how companies process and store their citizens' data. Ensuring global data compliance across jurisdictions is increasingly difficult in this quickly changing regulatory environment.

SUMMARY

In various embodiments, the described system solves the problem of ensuring global data compliance across jurisdictions by enabling businesses to handle regulated data appropriately for each jurisdiction. According to various embodiments, a system enables storing, securing, processing, and delivering data within geographic bounds of sovereign nations, in compliance with regulatory obligations, while still maintaining a centralized application stack. A network of data storage is maintained in each country, with a distributed application layer. Data storage in each country is securely managed, and data can be stored and delivered in compliance with jurisdictional regulations, without crossing borders, while still allowing a centralized application stack. As described in more detail below, in at least one embodiment, this is accomplished by using domain mapping so that a node in a specific country can serve data to a centrally managed web application.

In at least one embodiment, storing, processing, and serving data across multiple jurisdictions are accomplished by the use of an inverse distributed database that stores relevant slices within each country. In at least one embodiment, the system hosts and manages a network of secure databases using a combination of top cloud providers and Tier 3 and 4 data centers.

The described techniques thus avoid the need for companies to set up their own networks of storage and processing across countries and to fully replicate an application stack in order to serve user interfaces in each country.

In some embodiments, a method of storing data may include, at a data store, receiving the data to be stored. Further, the method may include, at a processor, determining whether the data is regulated in a jurisdiction, and, responsive to the determination, selecting either:
- a regulated storage scheme, possibly from a plurality of regulated storage schemes, wherein the regulated storage scheme requires that the data be stored and/or processed in the jurisdiction in accordance with one or more laws pertaining to the jurisdiction; or
- an unregulated storage scheme, in which the data is not required to be stored in the jurisdiction and/or is not required to be stored in accordance with the one or more laws.

Further, if a regulated storage scheme is selected, the method may include, at the processor, following the regulated storage scheme by initiating storage of the data in the jurisdiction in accordance with the one or more laws.

Selecting the storage scheme may include executing a software developer kit (SDK) method call of an API stored at least partially on the data store.

Selecting the storage scheme may include executing a REST API call to an API stored at least partially on the data store.

The method may further include, prior to initiating storage of the data, encrypting the data without storing a key for decrypting the data on the data store.

The method may further include, responsive to initiating storage of the data in the jurisdiction in accordance with the one or more laws, routing data at a router to a local data store in the jurisdiction, and storing the data at the local data store.

The method may further include, prior to routing the data to the local data store, encrypting the data.

The data may include a plurality of indexed fields. Encrypting the data may include using a SHA-256 hash to encrypt the indexed fields, and using AES256 symmetric encryption to encrypt the data.

The method may further include, at an input device, after storing the data, receiving user input from a user, and, responsive to receipt of the user input, retrieving the data using a hashed key of the SHA-256 hash at the router, and decrypting the data using an encryption key of the AES-256 symmetric encryption. The method may further include, at an output device, outputting the data for the user.

The data may be owned by a first owner. Encrypting the data may include using a first encryption scheme. The method may further include encrypting second data, owned by a second owner different from the first owner, using a second encryption scheme different from the first encryption scheme. The method may further include, at the router, routing second data.

The method may further include, responsive to initiating storage of the data in the jurisdiction in accordance with the one or more laws, further routing the data, at the router, to a second local data store in the jurisdiction, and, at the second local data store, storing the data.

The one or more laws may restrict transmission of the data out of the jurisdiction. The method may further include, at an input device located in the jurisdiction, after storing the data, receiving user input from a user via a web browser. Responsive to receipt of the user input, the data may be retrieved from the local data store. At an output device, a domain overlay may be used to output the data for the user via the web browser.

Receiving the user input may include receiving the user input from within a point of presence within the jurisdiction. Retrieving the data may include retrieving the data from within the point of presence.

Receiving the user input from within the point of presence may include receiving the user input from within a secure container. Retrieving the data from within the point of presence may include retrieving the data from within the secure container.

The method may further include detecting intrusion of a host of the local data store in the secure container, and, responsive to detection of the intrusion, transmitting notification of the intrusion to the user.

The method may further include processing the data directly within the container.

Other features and benefits of the technology described herein will be set forth in greater detail subsequently.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

The present document describes systems and methods for storing data in accordance with jurisdiction-specific requirements. Regulated data may be routed, stored, and retrieved in accordance with laws and regulations of the applicable jurisdiction. The applicable jurisdiction may be the region, country, state, and/or city in which the data is generated, stored, transmitted, retrieved, and/or used. Additionally or alternatively, the applicable jurisdiction may otherwise have regulatory authority over the owner and/or user of the data.

Data that is determined to be regulated may be automatically stored by the system in accordance with the applicable laws and regulations. Where mandated by the applicable laws and regulations, the data may be stored in the applicable jurisdiction, encrypted, maintained separate from other data, backed up, stored redundantly, and/or kept within the jurisdiction as it is retrieved by a user within the jurisdiction.

System Architecture

According to various embodiments, the system can be implemented on any one or more electronic devices equipped to receive, store, process, and present information. Such an electronic device may be, for example, a desktop computer, laptop computer, smartphone, tablet computer, smartphone/tablet ("phablet"), wearable computing device, and/or the like. Any of a wide variety of device types, operating systems, and the like may be used. Accordingly, the following description is intended to illustrate various embodiments by way of example, rather than to limit scope.

Figure 1A:
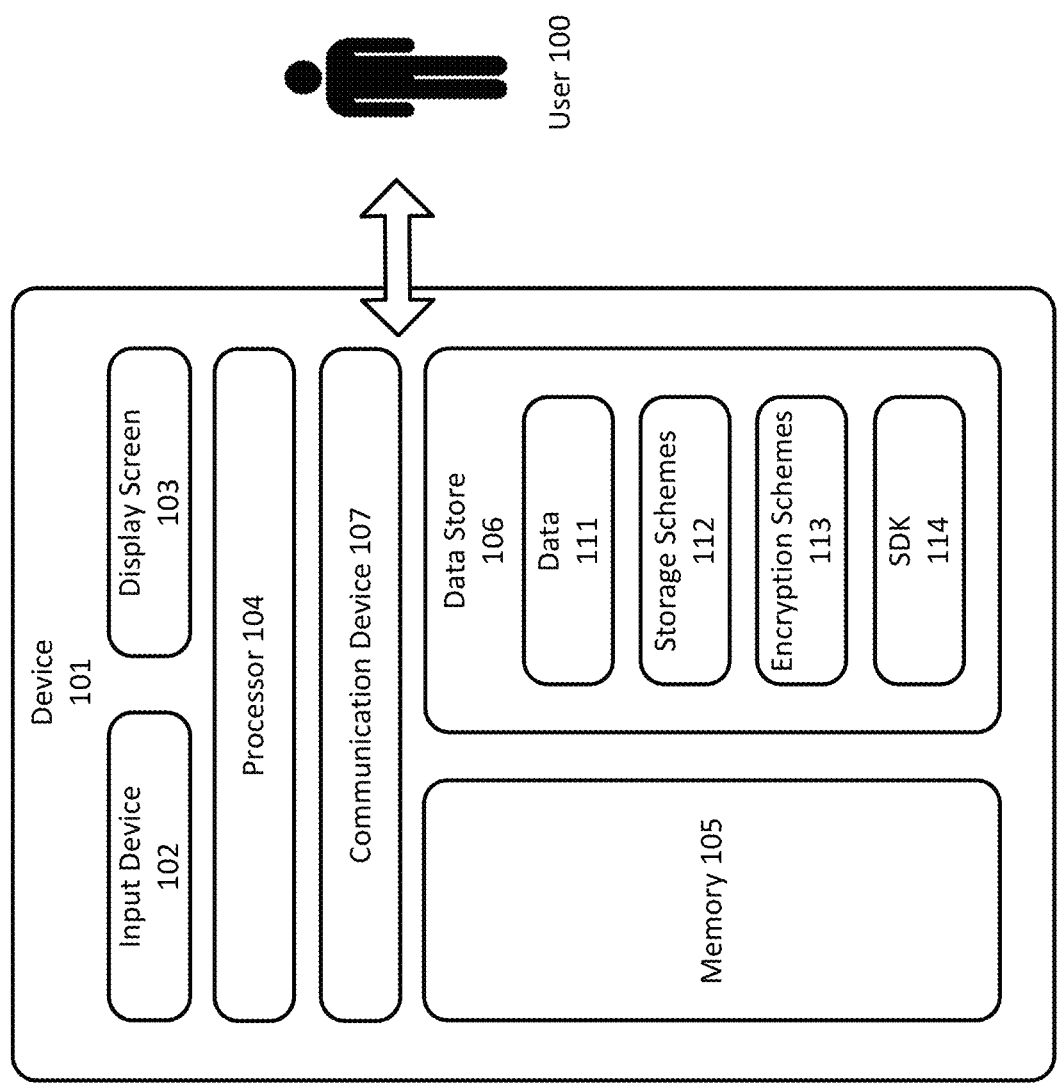
FIG. 1A is a block diagram depicting a hardware architecture according to one embodiment.

Referring now to FIG. 1A, there is shown a block diagram depicting a hardware architecture for practicing the described system, according to one embodiment. Such an architecture can be used, for example, for implementing the techniques of the system in a computer or other device 101. Device 101 may be any electronic device.

In at least one embodiment, device 101 has a number of hardware components well-known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and data from data store 106 can be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may include data 111, storage schemes 112, encryption schemes 113, an SDK 114, and/or other data (not shown), which may include any additional data that facilitates data storage and/or retrieval in compliance with jurisdiction-specific requirements. Data 111 may be the information that is to be stored in accordance with jurisdiction-specific requirements. Storage schemes 112 may be protocols for storing data 111 in accordance with the laws and regulations of one or more jurisdictions. Encryption schemes 113 may be methods of encrypting data 111, which may be indicated by storage schemes 112. SDK 114 may be a software developer kit that provides certain functions to facilitate storage of data 111 by software, which may be hosted on device 101.

In at least one embodiment, data 111, storage schemes 112, encryption schemes, 113 and/or SDK 114 can be stored at another location, remote from device 101, and device 101 can access such data 111, storage schemes 112, encryption schemes 113, and/or SDK 114 via any suitable communications protocol.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

Display screen 103 can be any element that displays information such as text and/or graphical elements. Display screen 103 may optionally display elements of data 111, storage schemes 112, encryption schemes 113, SDK 114, and/or other data pertinent to jurisdiction-specific data storage and/or retrieval. Display screen 103 may display any known user interface elements, including elements that modify the presentation of information on display screen 103. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

Figure 1B:
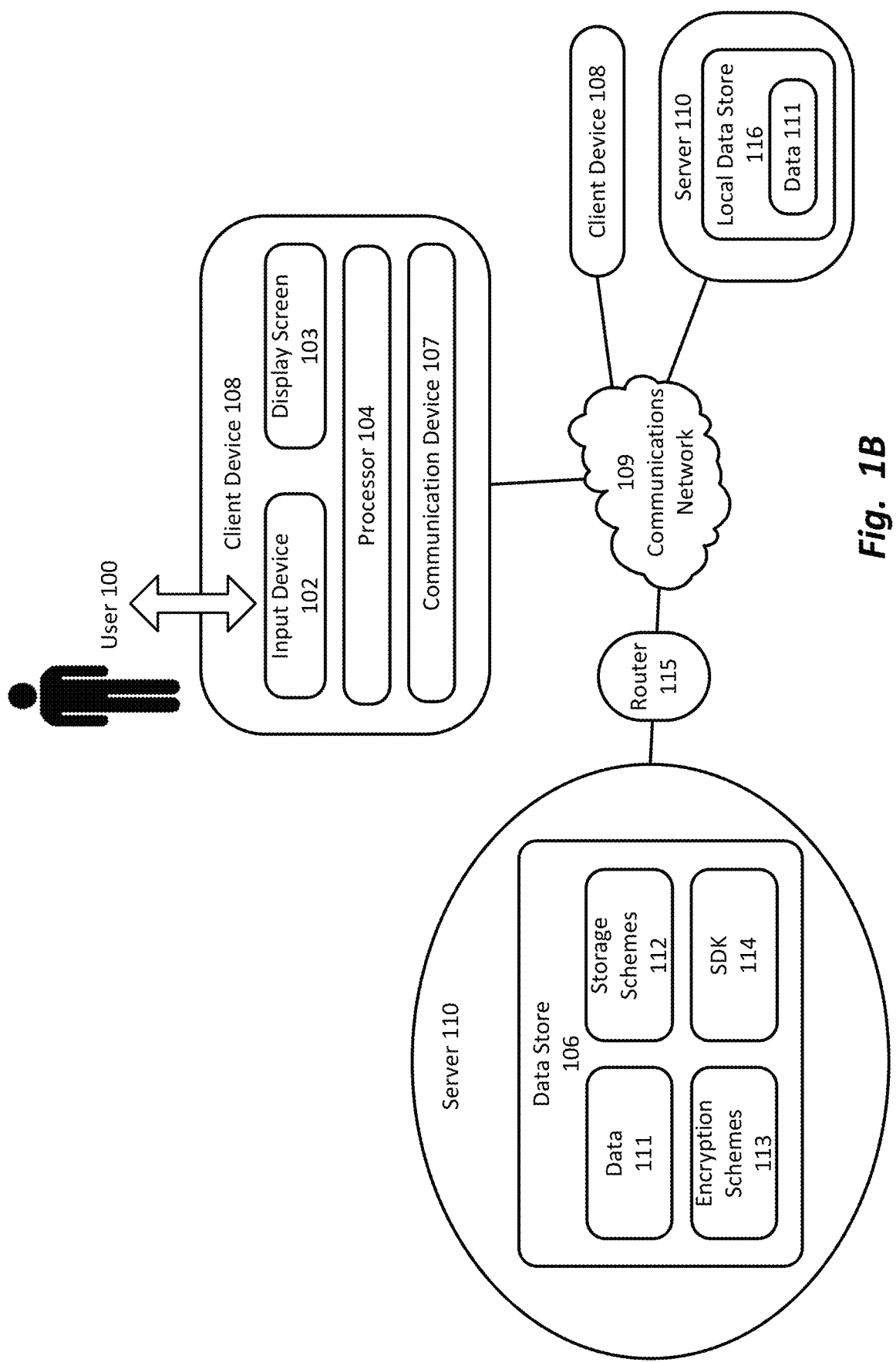
FIG. 1B is a block diagram depicting a hardware architecture in a client/server environment, according to one embodiment.

Referring now to FIG. 1B, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

Information may be routed between one or more servers 110 and/or client devices 108 by one or more routers 115. In some embodiments, the one or more routers 115 may be specially designed in order to implement storage schemes 112 by which data 111 is routed to and from the jurisdiction in which it is to be stored. In alternative embodiments, the one or more routers 115 may be incorporated into servers 110 and/or client devices 108.

In one implementation, server 110 is responsible for data storage and processing, and incorporates data store 106. Server 110 may include additional components as needed for retrieving data from data store 106 in response to requests from client device 108. In some embodiments, server 110 may reside in a jurisdiction in which data 111 is to be stored, per laws and regulations pertinent to the jurisdiction. Accordingly, server 110 may have a local data store 116 in which data 111 is to be stored within the jurisdiction. Server 110 from which data 111 is transmitted may route data 111 to server 110 having local data store 116 via one or more routers 115.

As in FIG. 1A, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 1A, data store 106 may include data 111, storage schemes 112, encryption schemes 113, SDK 114, and/or other data (not shown); alternatively, such data 111, storage schemes 112, encryption schemes 113, SDK 114, and/or other data can be stored elsewhere (such as at another server) and retrieved as needed.

In addition to or in the alternative to the foregoing, data 111, storage schemes 112, encryption schemes 113, SDK 114, and/or other data may also be stored in a data store 106 present in client device 108. In some embodiments, data 111, storage schemes 112, encryption schemes 113, SDK 114, and/or other data may have elements distributed between server 110 and client device 108 and/or other computing devices in order to facilitate secure and/or effective communication between these computing devices.

As in FIG. 1A, display screen 103 can be any element that displays information such as text and/or graphical elements. Various user interface elements, dynamic controls, and/or the like may be used in connection with display screen 103.

As also set forth in FIG. 1A, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. Communication device 107 may communicate with other computing devices through the use of any known wired and/or wireless protocol(s), as also set forth in the description of FIG. 1A.

In one embodiment, some or all of the system can be implemented as software written in any suitable computer programming language, whether in a standalone or client/server architecture. Alternatively, it may be implemented and/or embedded in hardware.

Notably, multiple servers 110 and/or multiple client devices 108 may be networked together, and each may have a structure similar to those of client device 108 and server 110 that are illustrated in FIG. 1B. The data structures and/or computing instructions used in the performance of methods described herein may be distributed among any number of client devices 108 and/or servers 110. As used herein, "system" may refer to any of the components, or any collection of components, from FIGS. 1A and 1B, and may include additional components not specifically described in connection with FIGS. 1A and 1B.

Data Structures

Figure 2:
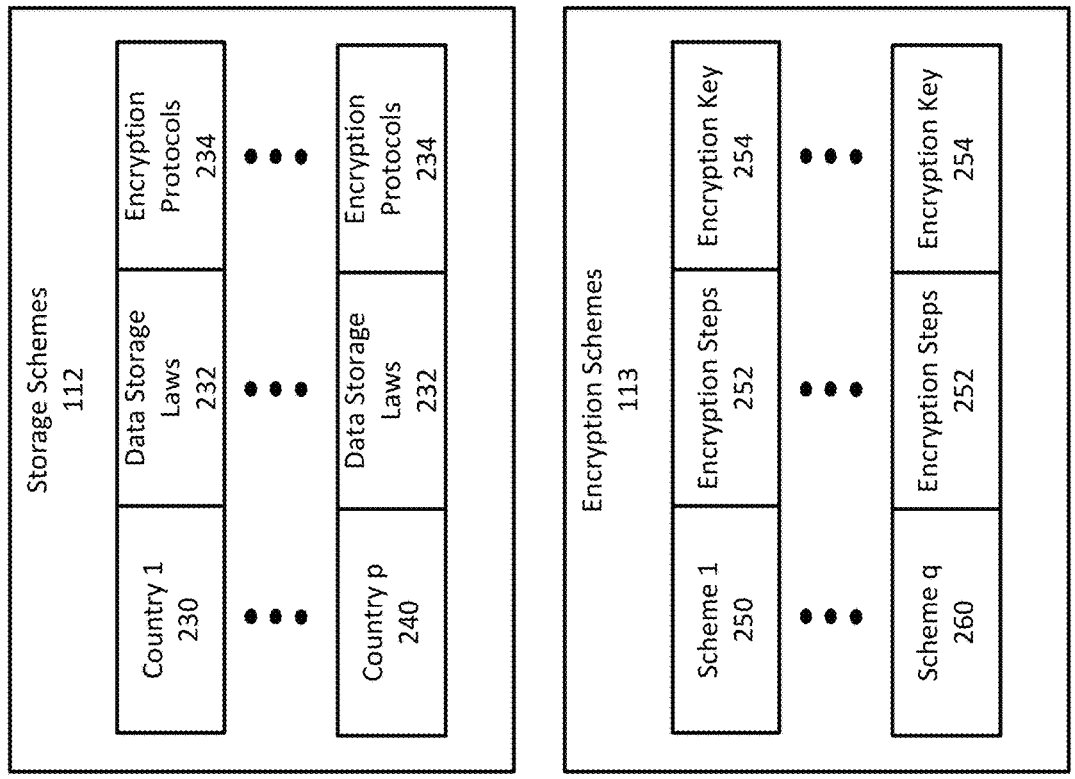
FIG. 2 is a block diagram depicting data that may be stored in connection with localized data storage and processing, according to one embodiment.
Figure 2:
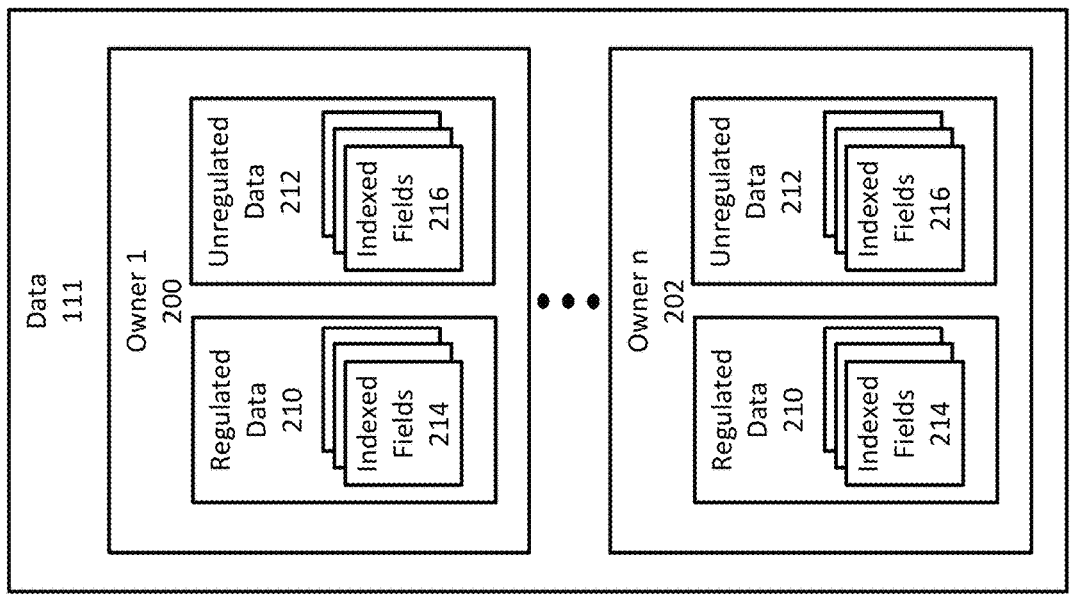

FIG. 2 is a block diagram depicting data that may be stored in connection with localized data storage and processing, according to one embodiment. Specifically, data 111, storage schemes 112, and encryption schemes 113 of FIGS. 1A and 1B are depicted in greater detail.

More specifically, data 111 may include, in some implementations, records for a plurality of owners that own or otherwise control portions of the data 111. Thus, data 111 may be divided into n records, pertaining to owner 1 200 through owner n 202.

Each record may include, for example, regulated data 210 and/or unregulated data 212. Regulated data 210 may be subject to one or more laws and/or regulations of a jurisdiction. By contrast, unregulated data 212 may not be subject to any such laws and/or regulations.

In some embodiments, unregulated data 212 may be data 111 that is unregulated in all jurisdictions in which data 111 is to be stored. In other embodiments, unregulated data 212 may be data that is simply unregulated in one or more particular jurisdictions of interest. As depicted in FIG. 2, all data 111 that is not regulated data 210 may be unregulated data 212. In some embodiments, regulated data 210 may be further broken down by jurisdiction (for example, with a class of regulated data 210 for each jurisdiction with applicable laws and regulations).

Regulated data 210 may have indexed fields 214, and unregulated data 212 may have indexed fields 216. Indexed fields 214 and indexed fields 216 may beneficially be stored in a manner that permits a user to query and/or search indexed fields 214 and/or indexed fields for particular portions of regulated data 210 and/or unregulated data 212, respectively. Searching regulated data 210 may pose a unique challenge due to the encryption and/or other jurisdiction-mandated data storage parameters applied to it. In some embodiments, indexed fields 214 of regulated data 210 may be stored in a manner that facilitates search and retrieval of the desired portion(s).

Storage schemes 112 may include, in some implementations, records for a plurality of storage schemes, each of which pertains to a particular jurisdiction. For example, storage schemes 112 may be divided into p records, pertaining to country 1 230 through country p 240.

Each record may include, for example, data storage laws 232 and encryption protocols 234. Data storage laws 232 may list the laws and/or regulations applicable to the country (or state, city, region, or other jurisdiction) to which the record applies. For example, data storage laws 232 may indicate where data 111 regulated by the jurisdiction can legally be stored, whether backups and/or redundant storage must be used, whether encryption must be used and if so what type, who is allowed to retrieve data 111, and/or whether data 111 is allowed to pass out of the jurisdiction during the retrieval process. Encryption protocols 234 may specify one or more particular encryption schemes (for example, of encryption schemes 113) that are to be used in connection with data 111 governed by the jurisdiction.

Encryption schemes 113 may include, in some implementations, records for a plurality of encryption schemes. For example, encryption schemes 113 may be divided into q records, pertaining to scheme 1 250 through scheme q 260.

Each record may include, for example, encryption steps 252 and/or one or more encryption keys 254. The encryption steps 252 may specify the particular algorithm(s) to be used for each scheme. Any encryption method may be used; some examples will be shown and described subsequently. The encryption key 254 for a given record may specify the key, or keys, needed to decrypt files encrypted with the corresponding encryption steps 252 of the record. In some implementations, it may be desirable for the encryption keys 254 to be stored separately from the remaining portions of the encryption schemes 113 (such as, for example, the encryption steps 252), and/or separately from the data 111 that is to be encrypted therewith. For example, in some embodiments, the server 110 that encrypts and initiates transmittal of data 111 to a particular jurisdiction may not store the encryption keys 254 needed to decrypt that data 111; rather, the encryption keys 254 may be stored in the local data store 116 in the jurisdiction, and/or in the data store 106 of a client device 108 at which the data 111 is to be received and decrypted.

Notably, FIG. 2 only depicts examples of data that may be recorded and used by a system according to the present disclosure. Data 111, storage schemes 112, and/or encryption schemes 113 may exclude any of the fields shown in FIG. 2, and/or may include additional fields of data not specifically shown in FIG. 2. Further, as mentioned previously, the system may capture and maintain other data in addition to or in the alternative to data 111, storage schemes 112, and encryption schemes 113.

Localized Data Storage and Processing

Figure 3:
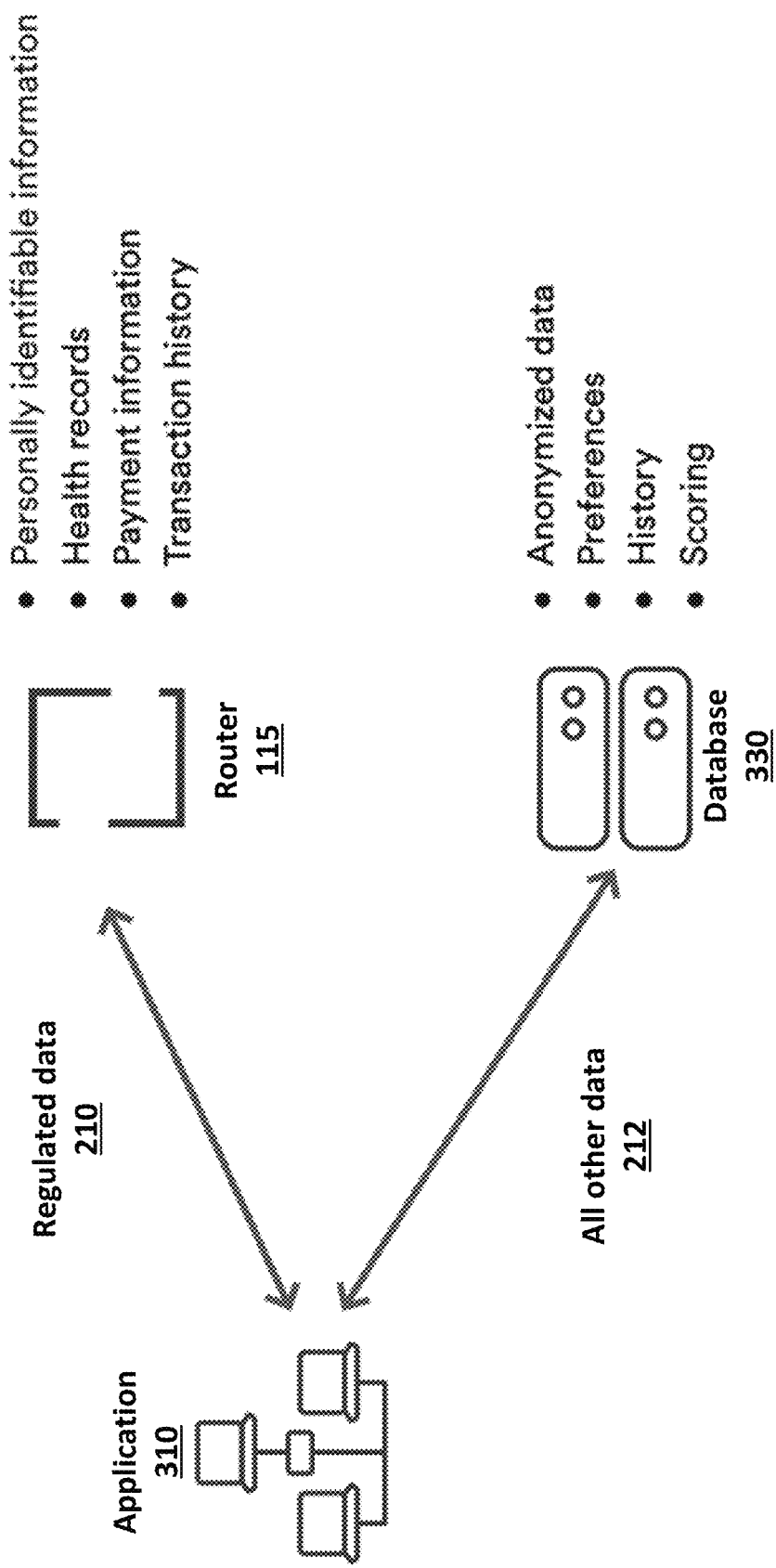
FIG. 3 is a block diagram depicting a system for handling of regulated and unregulated data, according to one embodiment.

In at least one embodiment, the system described herein provides mechanisms for handling regulated data differently from other data. FIG. 3 is a block diagram depicting a system 300 for handling of regulated data 210 and unregulated data 212, according to one embodiment.

As depicted in FIG. 3, regulated data 210 can include more sensitive data 111 such as, for example, personally identifiable information, health records, payment information, and transaction history. Unregulated data 212 may include other, less sensitive data 111, which can be handled by conventional database storage, and can include, for example, anonymized data, preferences, history, and scoring data.

An application 310 may, in some instances, generate and/or store both types of data. System 300 may handle regulated data 210 with jurisdiction-specific routing (for example, via router 115), and may store unregulated data 212 in a more conventional database 330.

According to known methods, secure handling of regulated data 210 within a jurisdiction (referred to as a "country" hereafter, which should be broadly read to include a country, city, county, state, region, or other law-making body) can be a complex and multi-step endeavor. In general, the process of integrating a new country into a data storage scheme (referred to as "onboarding") can involve a team of experts across many disciplines, including legal, compliance, hosting operations, engineering, database administrators, network operations, information security, technical writing, risk, and technical operations.

The following table illustrates, by example, the teams that may be involved in the various steps for onboarding a country.

| Step | Team |
| --- | --- |
| Research data compliance | Legal |
| Create compliance regimen | Compliance |
| Select hosting provider | Hosting operations |
| Contract hosting provider | Hosting operations |
| Select secondary hosting provider | Hosting operations |
| Contract secondary hosting provider | Hosting operations |
| Implement API layer | Engineering |
| Implement data layer | Database administrators |
| Implement data backup | Database administrators |
| Implement efficient WAN access | Network operations |
| Ensure security | Information security |
| Educate application developers on API | Technical writing/education |
| Appropriate cyberinsurance | Risk |
| Ongoing maintenance | Technical operations |
| Audits | Compliance, Technical operations |
| Program Management | Program Management |

Figure 4:
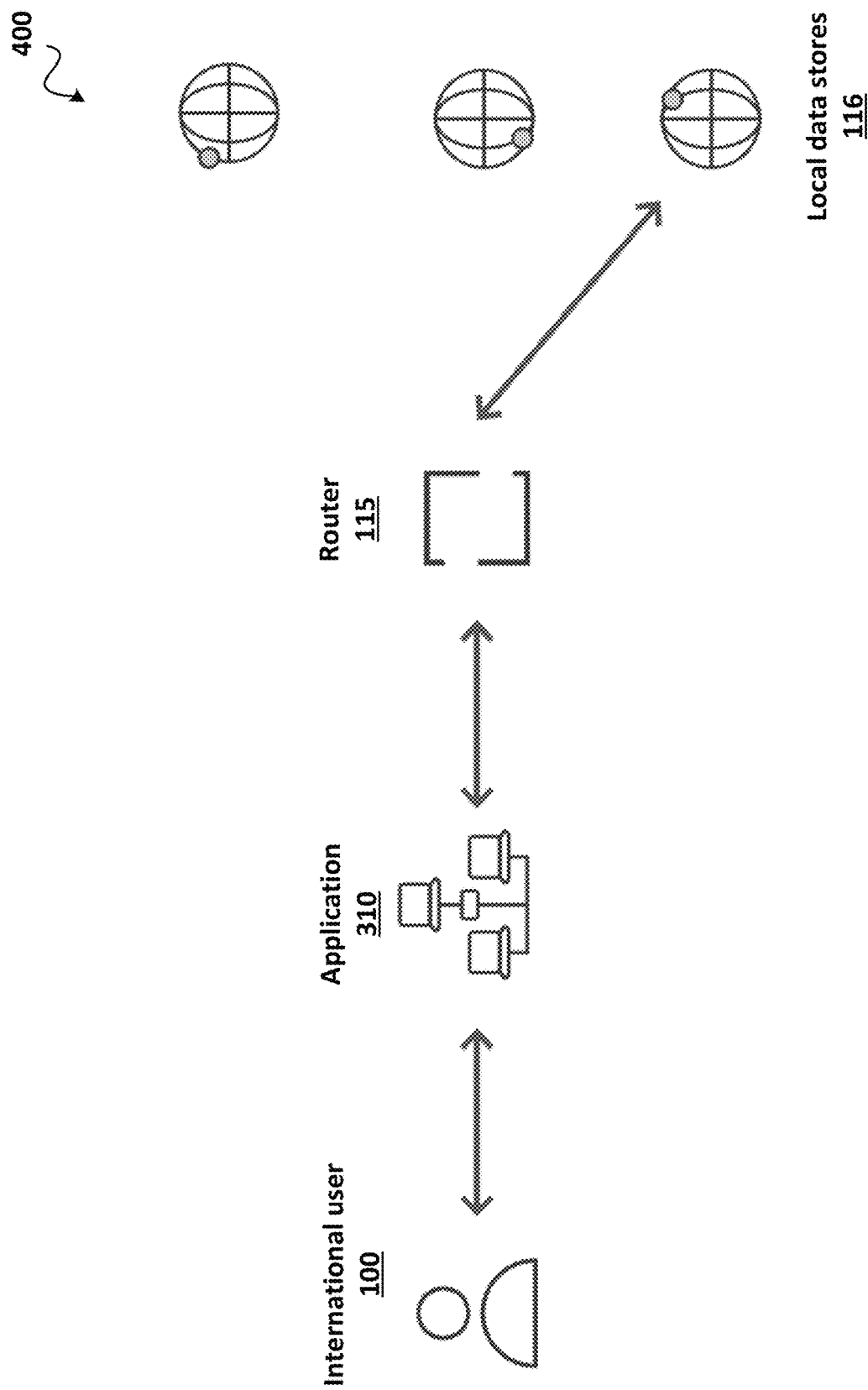
FIG. 4 is a block diagram depicting high-level architecture for implementing a system according to the present disclosure, according to one embodiment.

FIG. 4 is a block diagram depicting high-level architecture 400 for implementing a system 300 according to the present disclosure, according to one embodiment. In at least one embodiment, the system 300 is implemented in the context of a software developer kit (SDK 114) integrated within an application running on an electronic device such as a device 101, client device 108, or server 110. SDK 114 may provide support for various programming languages, such as Java, PHP, Python, Scala, Ruby, and the like. SDK method calls may be directed to each country using router 115, which may be a specialized router, either by communicating through the router 115 or retrieving the location of a particular point of presence. Local data stores 116, or points of presence, can be established in each country according to local regulations. At every step, system 300 may implement a high level of security to ensure that data 111 is safe and is never compromised.

Figure 5:
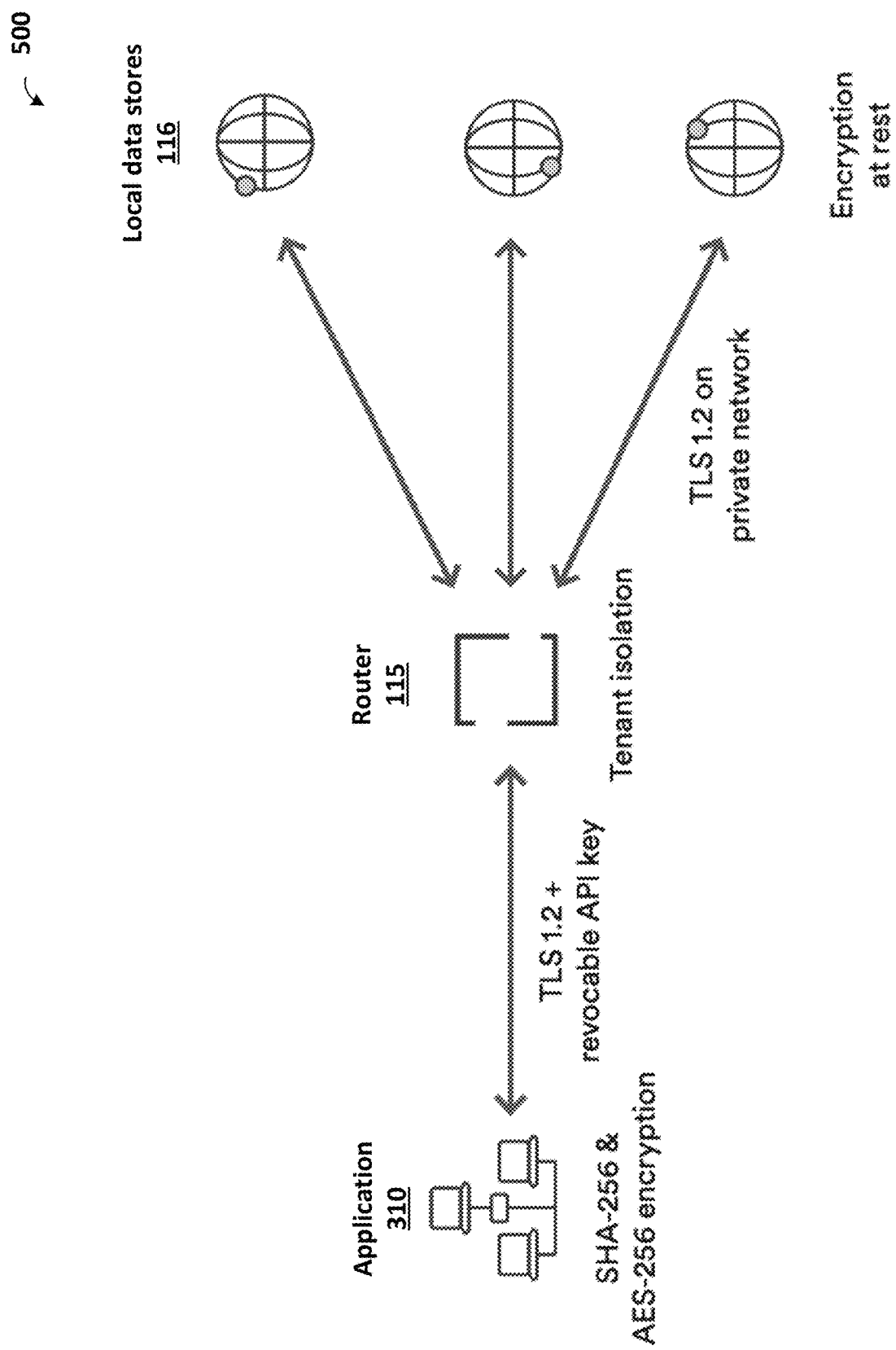
FIG. 5 is a block diagram depicting encryption and secure transmission of data in the architecture of FIG. 4, according to one embodiment.

FIG. 5 is a block diagram depicting encryption and secure transmission 500 of data 111 within architecture 400 of FIG. 4, according to one embodiment. The first step may be to encrypt data 111 within application 310. This can be done, for example, using a private key and key management system provided and implemented by the operator of application 310. This way, only that application 310 (or authorized other parties) can decrypt data 111. The native encryption built into any desired language can be used, so that the encryption is implemented natively using known and proven libraries. The encryption can be performed at a level similar to typical encryption on disk. Encrypted data 11 may then be sent to router 115, which may be a specialized router at the same encryption level.

In at least one embodiment, all network communication is performed securely, using for example, Transport Layer Security (TLS) 1.2 and a revocable application programming interface (API) key. In at least one embodiment, tenants (for example, owners of data 111) are fully isolated from one another, such that only a given tenant's data 111 can be accessed using the corresponding API. All data 111 may be stored on fully isolated servers 110 (for example, on local data stores 116) with encryption at rest.

Figure 6:
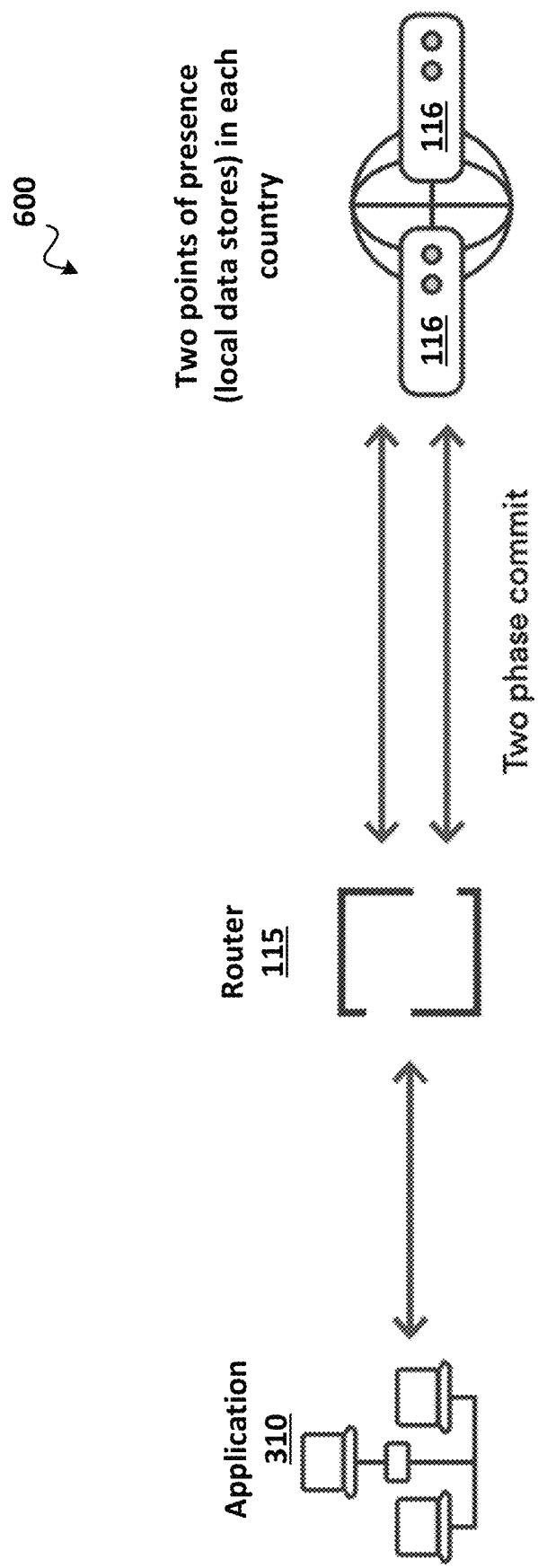
FIG. 6 is a block diagram depicting data storage in two or more separate points of presence within a jurisdiction, according to one embodiment.

FIG. 6 is a block diagram depicting data storage 600 in two or more separate points of presence within a jurisdiction, according to one embodiment. This redundancy may allow for secure, reliable access of data 111 in case one location (for example, one local data store 116) goes offline or is shut off due to governmental intervention or other factors. In at least one embodiment, a mix of global cloud providers and reputable Tier 4 data centers is used to provide two Tier 4 facilities in each country.

Examples of cloud providers that can be used in connection with system 300 include:

Amazon Web Services;
Microsoft Azure;
Google Cloud; and
Alibaba Cloud.

Tier 4 data centers used in connection with system 300 can include any or all of the following features and characteristics:

Redundant interconnects;
Redundant power;
Redundant cooling; and
Secure facilities.

Figure 7:
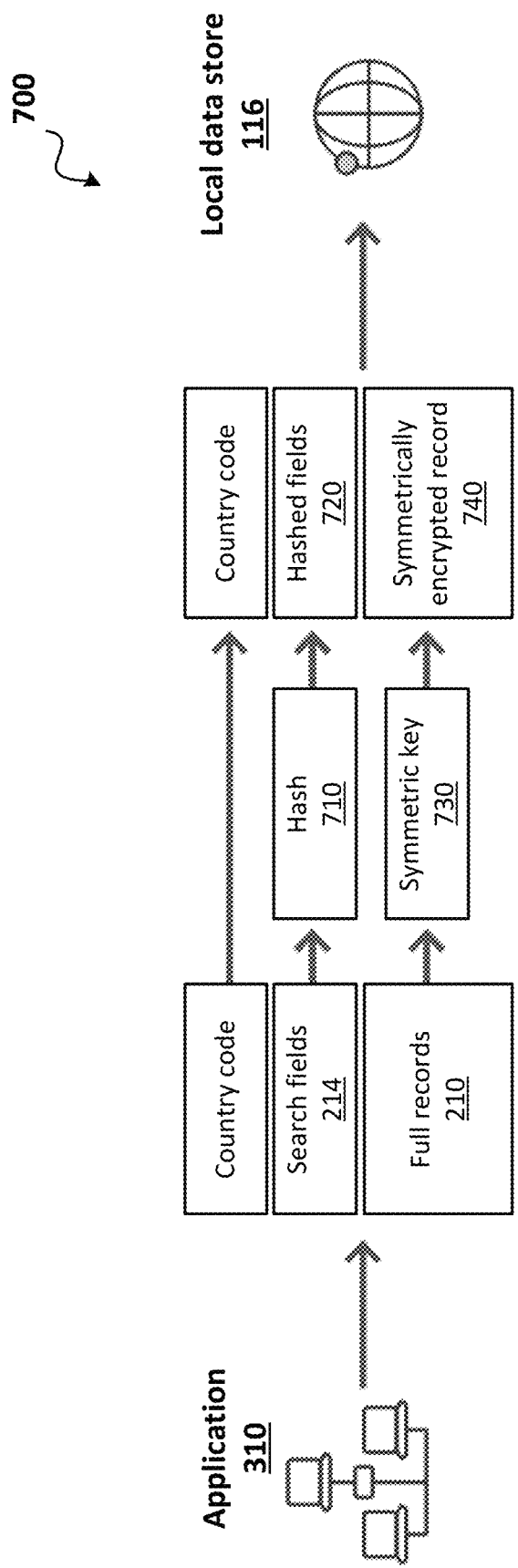
FIG. 7 is a block diagram depicting differential encryption of indexed fields and entire records, according to one embodiment.

FIG. 7 is a block diagram depicting differential encryption 700 of indexed fields 214 and entire records, according to one embodiment. In at least one embodiment, system 300 offers a searchable encrypted database by implementing two different types of encryption. Data 111 may be encrypted directly within application 310 using a custom SDK (for example, the SDK 114) that uses a SHA-256 hash 710 to encrypt indexed fields 214 to provide hashed fields 720, and AES-256 symmetric encryption 730 to encrypt the entire record to provide a symmetrically encrypted record 740. The symmetrically encrypted record 740 can be, for example, a JSON payload that can include JSON encoded images if desired. For example, in an e-commerce use case, the customer ID, name, and city are hashed, and then the customer transaction history is encrypted symmetrically.

Figure 8:
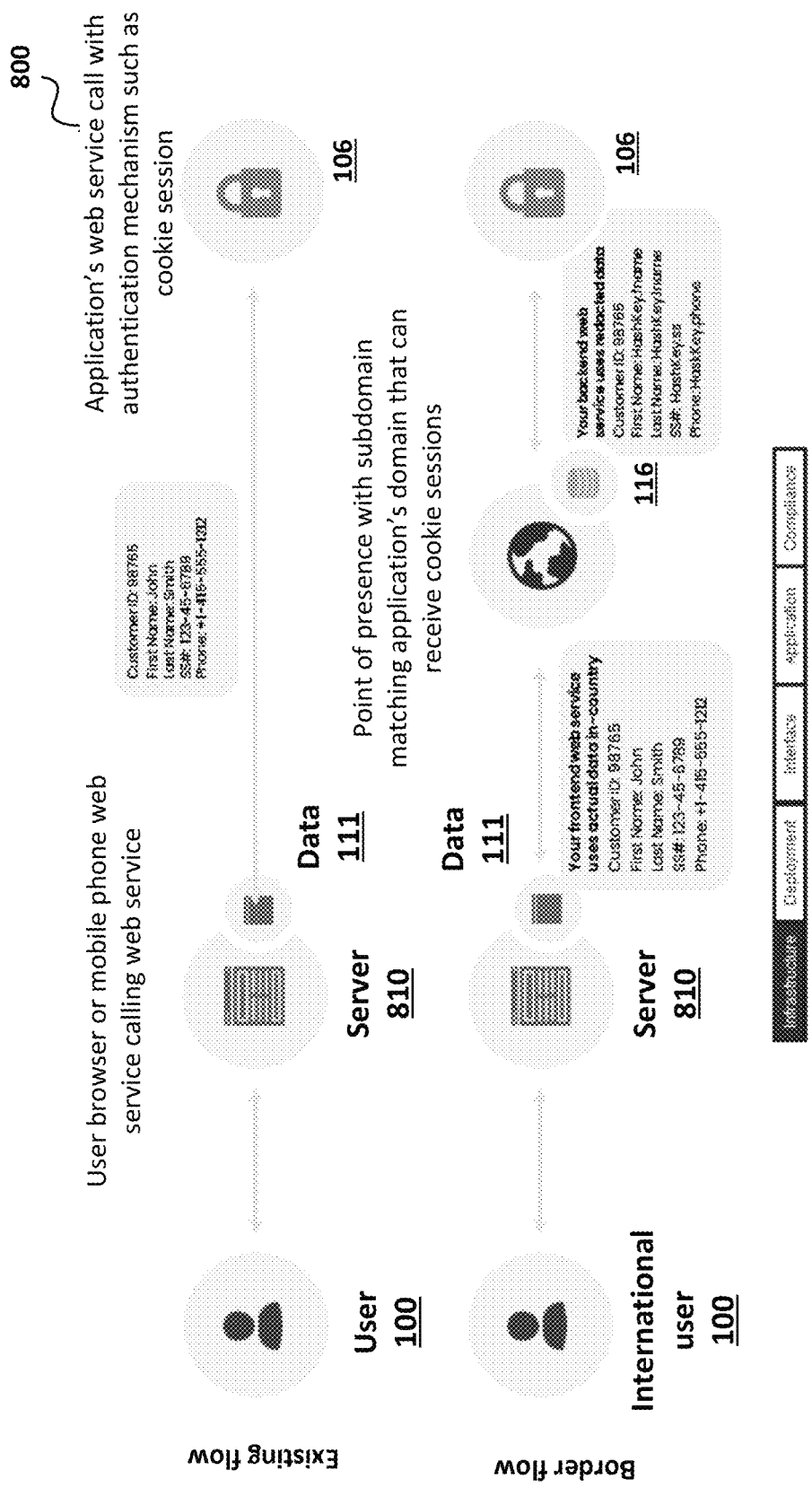
FIG. 8 is a block diagram depicting retrieval of data encrypted via the differential encryption of FIG. 7, according to one embodiment.

FIG. 8 is a block diagram depicting retrieval 800 of data 111 encrypted via the differential encryption of FIG. 7, according to one embodiment. Data 111 can be retrieved using one or more of the hashed keys and then decrypted using encryption key 254, which may be provided by the operator of application 310.

The top half of FIG. 8 depicts a flow in which data 111 is called by web service 810, which may function on device 101 and/or client device 108, to query data store 106 for data 111. Data 111 may be decrypted and provided to user 100. Data store 106 may reside on server 110, which may not be in the applicable jurisdiction. The bottom half of FIG. 8 depicts retrieval of data 111 in which web service 810 (for example, data store 106) handles only data 111 in encrypted and/or redacted form. Web service 810 may receive actual data 111 from local data store 116 located in the applicable jurisdiction. Thus, actual data 111 may only be transmitted within the applicable jurisdiction.

In at least one embodiment, system 300 fully encrypts data 111 but does not have access to encryption key 254. Any suitable encryption methodology can be used, allowing system 300 to be very flexible and allowing for arbitrary data 111 to be secured and stored. This is in contrast to tokenization (a use case that is popular for payment information), where a provider will generate a fake credit number for example, that can then be swapped with the real credit card number which can then be stored in place of the real credit card number by the customer.

Figure 9:
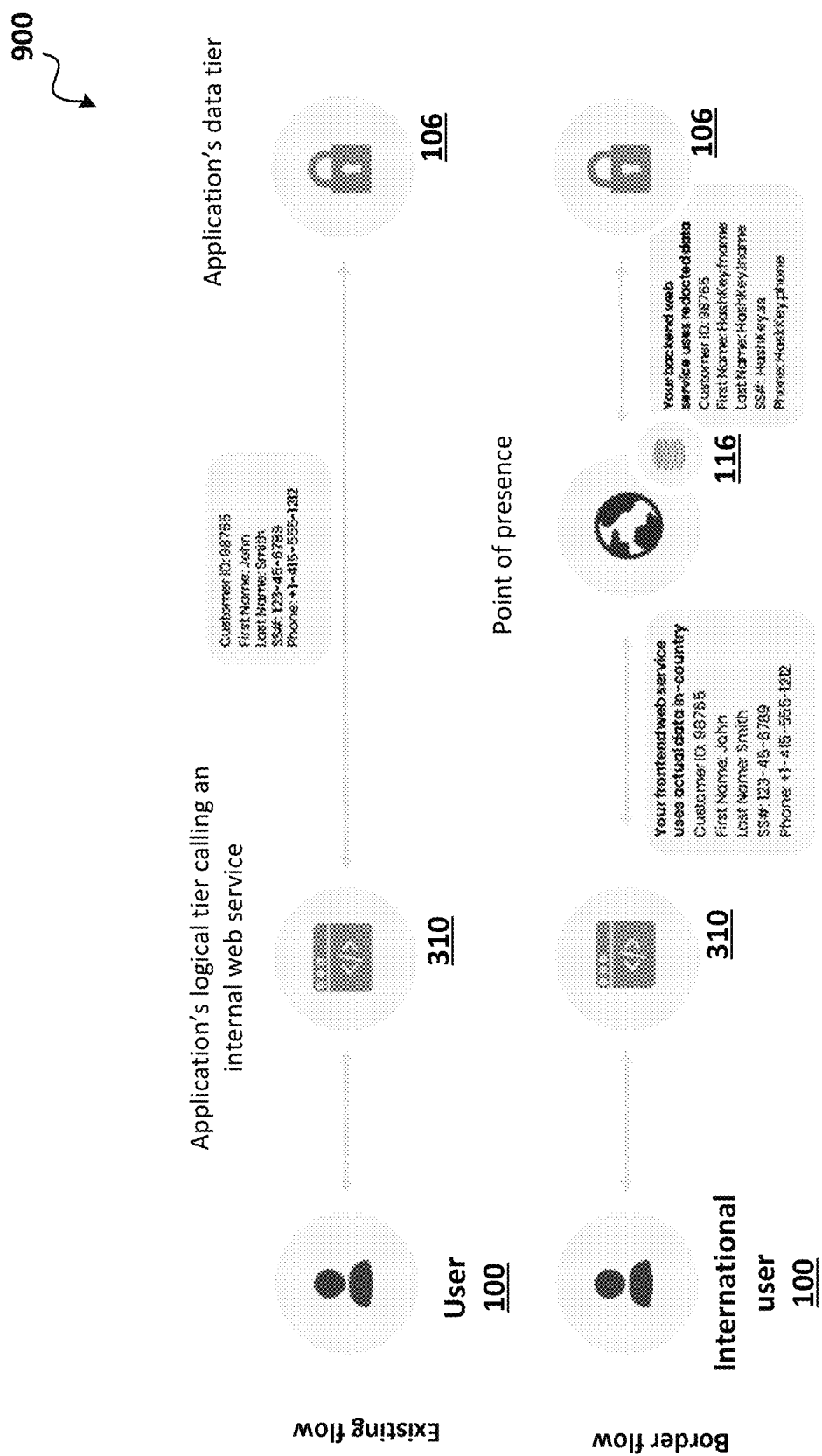
FIG. 9 is a block diagram depicting retrieval of data encrypted via the differential encryption of FIG. 7, according to another embodiment.

FIG. 9 is a block diagram depicting retrieval 900 of regulated data 210, in which data 111, such as regulated data 210, is maintained in the applicable jurisdiction during the retrieval process, according to another embodiment. An application, such as application 310 referenced previously, may be used to call for data 111 in place of web service 810.

Figure 10:
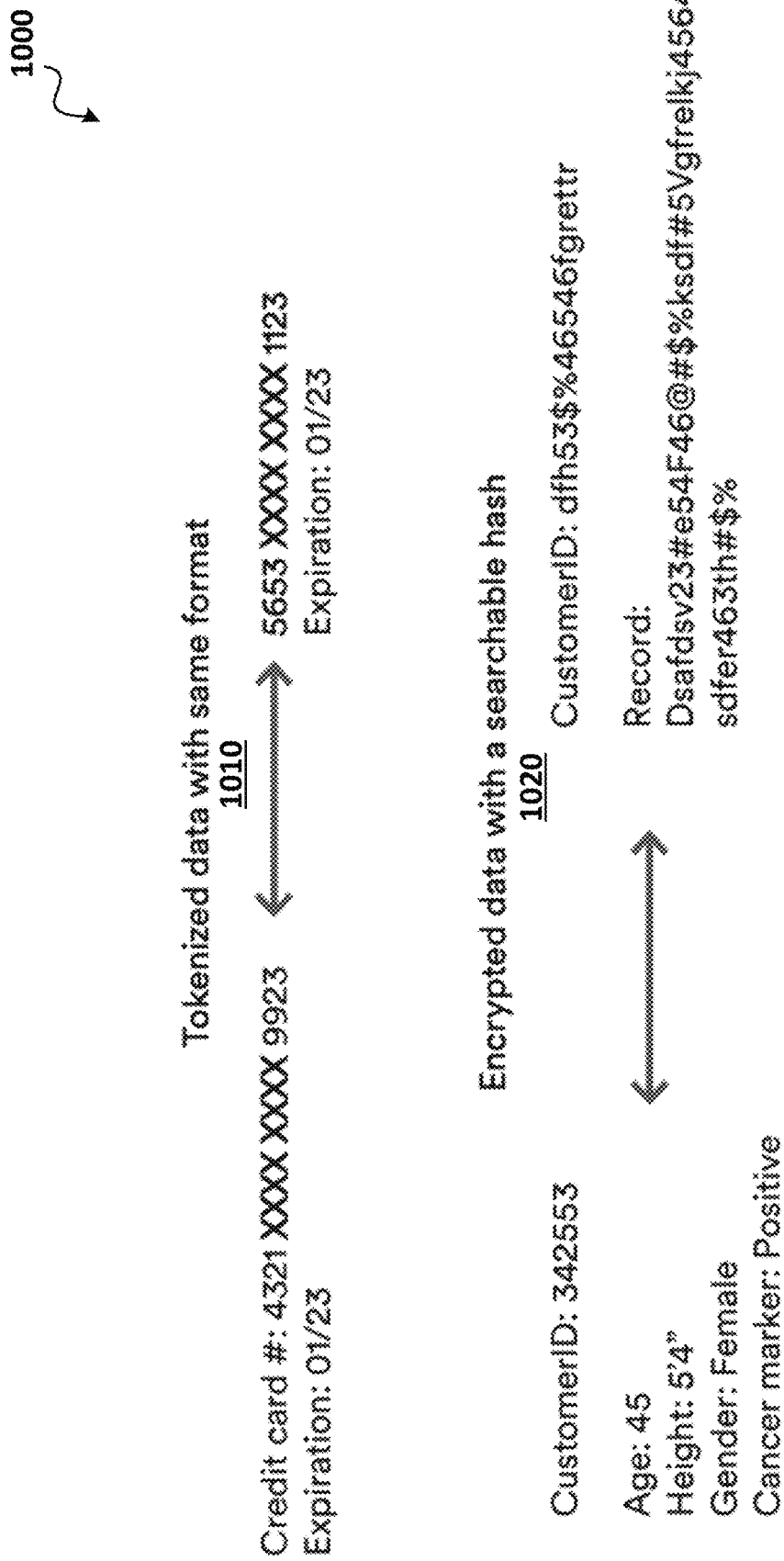
FIG. 10 is a block diagram depicting tokenized data and data that has been encrypted with a searchable hash code, according to one embodiment.

FIG. 10 is a block diagram depicting data 1000, including tokenized data 1010 and data 1020 that has been encrypted with a searchable hash code, according to one embodiment.

Figure 11:
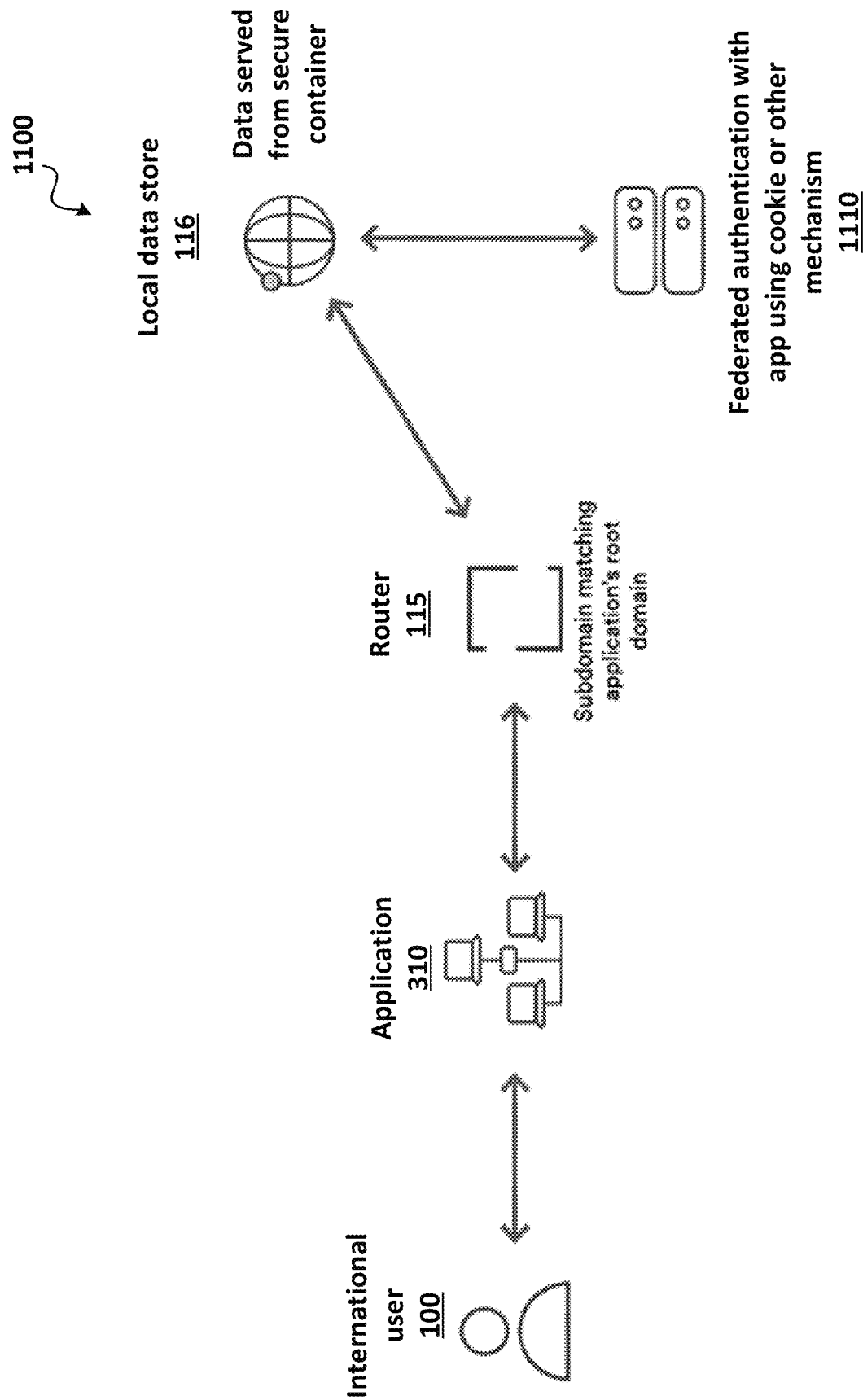
FIG. 11 is a block diagram depicting retrieval of regulated data in which the regulated data is maintained in the applicable jurisdiction, according to one embodiment.

FIG. 11 is a block diagram depicting retrieval 1100 of regulated data 210, in which data 111, such as regulated data 210, is maintained in the applicable jurisdiction during the retrieval process, according to one embodiment. In circumstances where, because of regulatory or other issues, data 111 cannot be permitted to leave a jurisdiction, a domain overlay can be used to serve data 111 from a point of presence (for example, local data store 116) in the jurisdiction (country) directly to a web browser. For example, ACME Company can assign india.acme.com to point to the point of presence in India. A user 100 in India can interact directly with www.acme.com to retrieve a web page. When the web application (for example, application 310) needs to access regulated data 210, it can have the user's browser directly query india.acme.com, which resolves to the point of presence, or local data store 116, in India.

The point of presence can then read federated authentication 1110, such as authentication cookies, to verify the user's identity with the main ACME web application 310, and can then serve data 111 directly to the browser. The data 111 may then be rendered by logic in the web browser for presentation to the user 100. This way, ACME still maintains a single web application 310, but can have regulated data 210 stored in a particular jurisdiction and served from that jurisdiction without the data 111 leaving the jurisdiction.

When processing batches of data, it can be more convenient to serve data from and/or process data directly within a point of presence, or local data store 116. In at least one embodiment, a function as a service can be deployed into the point of presence using a secure container. If the host peers within the container, the requester may be notified of the intrusion. This way, a secure container can even include encryption keys 254 to decrypt data with relative certainty that the encryption key 254 is not compromised. Using a domain overlay model, where a customer of the system can have their own domain mapped to the point of presence, data 111 can be served directly to a web browser application 310 run by a user 100. For example, india.acme.com can serve data directly from a point of presence in India to a browser running in India, even if the main web application is served from a centralized www.acme.com.

Figure 12:
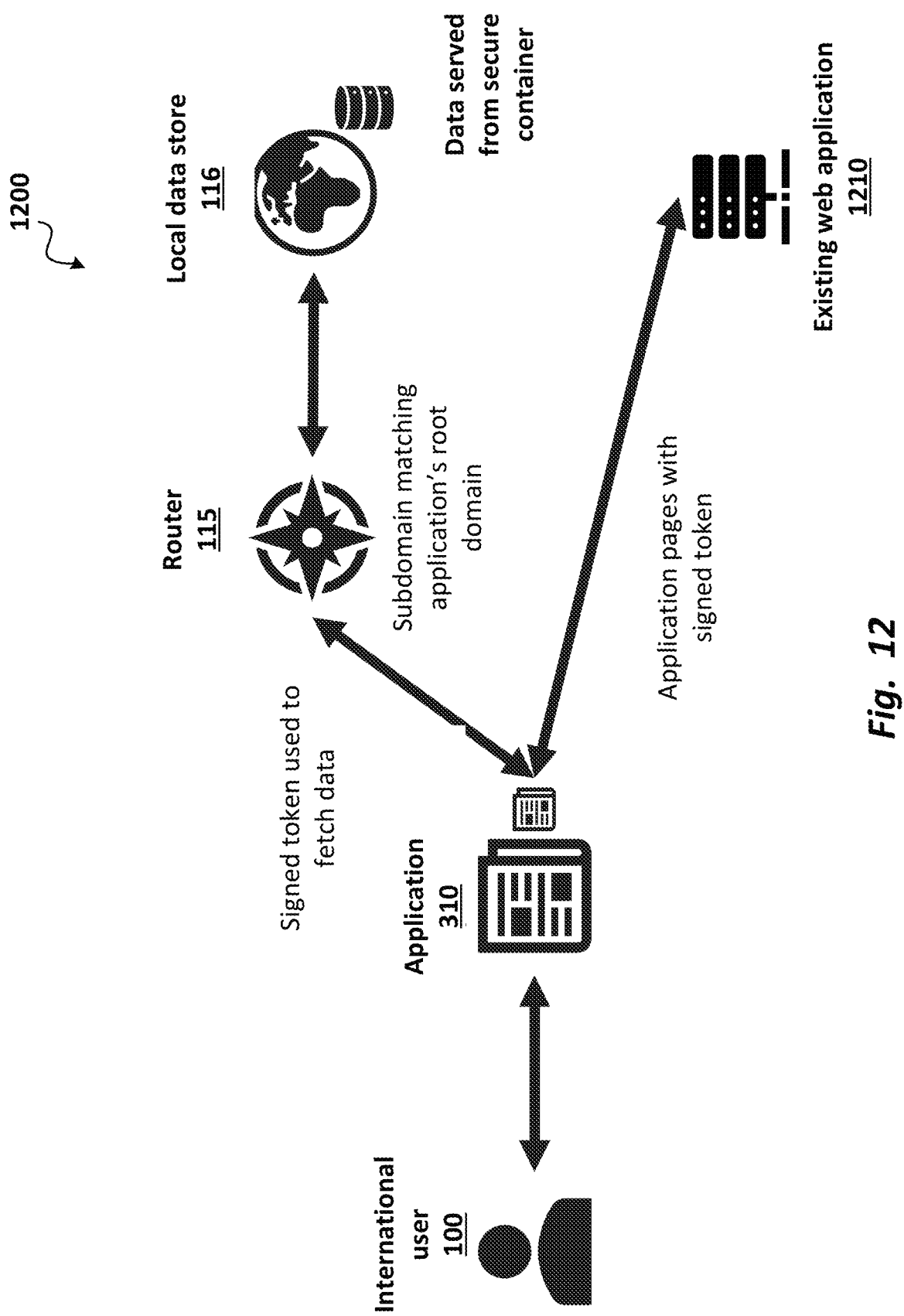
FIG. 12 is a block diagram depicting retrieval of regulated data in which the regulated data is maintained in the applicable jurisdiction, according to another embodiment.

FIG. 12 is a block diagram depicting retrieval 1200 of regulated data 210, in which regulated data 210 is maintained in the applicable jurisdiction during the retrieval process, according to one alternative embodiment. Retrieval 1200 may be similar to retrieval 1100 of FIG. 11, except that in FIG. 12, application 310 may send the browser a signed token. The signed token may be submitted to local data store 116 to retrieve the regulated data 210 from local data store 116. Application pages with the signed token may be presented on existing web application 1210.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method for storing data, the method comprising:
   at a data store, receiving data to be stored, wherein the data comprises a plurality of indexed fields;
   at a processor, determining whether the data is regulated in a jurisdiction;
   at the processor, responsive to determining that the data is regulated in the jurisdiction, selecting a storage scheme from a group consisting of:
      a regulated storage scheme, requiring that the data be stored in the jurisdiction in accordance with one or more laws pertaining to the jurisdiction; and
      an unregulated storage scheme, in which the data is not required to be stored in the jurisdiction and/or is not required to be stored in accordance with one or more laws; and
   responsive to selection of the regulated storage scheme, at the processor, following the regulated storage scheme by:
      encrypting the data;
      at a router, routing the encrypted data to a local data store in the jurisdiction, in accordance with the one or more laws; and
      at the local data store, storing the data;
   wherein encrypting the data comprises:
      using a SHA-256 hash to encrypt the indexed fields; and
      using AES-256 symmetric encryption to encrypt the data.

2. The method of claim 1, further comprising:
   at an input device, after storing the data, receiving user input from a user;
   responsive to receipt of the user input:
      at the router, retrieving the data using a hashed key of the SHA-256 hash;
      at the processor, decrypting the data using an encryption key of the AES-256 symmetric encryption; and
      at an output device, outputting the data.

3. A method for storing data, the method comprising:
   at a data store, receiving data to be stored;
   at a processor, determining whether the data is regulated in a jurisdiction;
   at the processor, responsive to determining that the data is regulated in the jurisdiction, selecting a storage scheme from a group consisting of:
      a regulated storage scheme, requiring that the data be stored in the jurisdiction in accordance with one or more laws restricting transmission of the data out of the jurisdiction; and
      an unregulated storage scheme, in which the data is not required to be stored in the jurisdiction and/or is not required to be stored in accordance with one or more laws;
   responsive to selection of the regulated storage scheme, at the processor, following the regulated storage scheme by:

at a router, routing the data to a local data store in the jurisdiction, in accordance with the one or more laws; and at the local data store, storing the data;

at an input device located in the jurisdiction, after storing the data, receiving user input from a user via a web browser;

responsive to receipt of the user input, retrieving the data from the local data store; and at an output device, using a domain overlay to output the data for the user via the web browser.

4. The method of claim 3, wherein selecting the regulated storage scheme comprises executing a software developer kit (SDK) method call of an API stored at least partially on the data store.

5. The method of claim 3, further comprising, prior to initiating storage of the data, encrypting the data without storing a key for decrypting the data on the data store.

6. The method of claim 3, further comprising, prior to routing the data to the local data store, encrypting the data.

7. The method of claim 6, wherein:
the data is owned by a first owner;
encrypting the data comprises using a first encryption scheme; and
the method further comprises:
encrypting second data, owned by a second owner different from the first owner, using a second encryption scheme different from the first encryption scheme; and
at the router, routing the second data.

8. The method of claim 3, further comprising,
at the router, further routing the data to a second local data store in the jurisdiction; and
at the second local data store, storing the data.

9. The method of claim 5, wherein:
receiving the user input comprises receiving the user input from within a point of presence within the jurisdiction; and
retrieving the data comprises retrieving the data from within the point of presence.

10. The method of claim 9, wherein:
receiving the user input from within the point of presence comprises receiving the user input from within a secure container; and
retrieving the data from within the point of presence comprises retrieving the data from within the secure container.

11. The method of claim 10, further comprising:
detecting intrusion of a host of the local data store in the secure container; and
responsive to detection of the intrusion, transmitting notification of the intrusion to the user.

12. A non-transitory computer readable medium for storing data, comprising instructions stored thereon, that when executed by a processor, perform the steps of:
causing a data store to receive data to be stored, wherein the data comprises a plurality of indexed fields;
determining whether the data is regulated in a jurisdiction;
responsive to determining that the data is regulated in the jurisdiction, selecting a storage scheme from a group consisting of:
a regulated storage scheme, requiring that the data be stored in the jurisdiction in accordance with one or more laws pertaining to the jurisdiction; and
an unregulated storage scheme, in which the data is not required to be stored in the jurisdiction and/or is not required to be stored in accordance with one or more laws; and
responsive to selection of the regulated storage scheme, following the regulated storage scheme by:
encrypting the data;
causing a router to route the encrypted data to a local data store in the jurisdiction, in accordance with the one or more laws; and
causing the local data store to store the data;
wherein encrypting the data comprises:
using a SHA-256 hash to encrypt the indexed fields; and
using AES-256 symmetric encryption to encrypt the data.

13. The non-transitory computer readable medium of claim 12, wherein:
the data is owned by a first owner;
encrypting the data comprises using a first encryption scheme; and
the non-transitory computer readable medium further comprises instructions stored thereon, that when executed by a processor:
encrypt second data, owned by a second owner different from the first owner, using a second encryption scheme different from the first encryption scheme; and
cause the router to route the second data.

14. The non-transitory computer readable medium of claim 12, further comprising instructions stored thereon, that when executed by a processor, perform the steps of:
causing an input device to receive user input from a user after storage of the data; and
responsive to receipt of the user input:
causing the router to retrieve the data using a hashed key of the SHA-256 hash;
decrypting the data using an encryption key of the AES-256 symmetric encryption; and
causing an output device to output the data.

15. A non-transitory computer readable medium for storing data, comprising instructions stored thereon, that when executed by a processor, perform the steps of:
causing a data store to receive data to be stored;
determining whether the data is regulated in a jurisdiction;
responsive to determining that the data is regulated in the jurisdiction, selecting a storage scheme from a group consisting of:
a regulated storage scheme, requiring that the data be stored in the jurisdiction in accordance with one or more laws restricting transmission of the data out of the jurisdiction; and
an unregulated storage scheme, in which the data is not required to be stored in the jurisdiction and/or is not required to be stored in accordance with one or more laws;
responsive to selection of the regulated storage scheme, following the regulated storage scheme by:
causing a router to route the data to a local data store in the jurisdiction, in accordance with the one or more laws; and
causing the local data store to store the data;
causing an input device located in the jurisdiction, after storage of the data, to receive user input from a user via a web browser;
responsive to receipt of the user input, retrieving the data from the local data store; and causing an output device to use a domain overlay to output the data via the web browser.

16. The non-transitory computer readable medium of claim 15, wherein selecting the regulated storage scheme comprises executing a software developer kit (SDK) method call of an API stored at least partially on the data store.

17. The non-transitory computer readable medium of claim 15, further comprising instructions stored thereon, that when executed by a processor, encrypt the data, prior to initiating storage of the data, without storing a key for decrypting the data on the data store.

18. The non-transitory computer readable medium of claim 15, further comprising instructions stored thereon, that when executed by a processor:
cause the router to further route the data to a second local data store in the jurisdiction; and
cause the second local data store to store the data.

19. The non-transitory computer readable medium of claim 15, wherein:
receiving the user input comprises receiving the user input from within a point of presence within the jurisdiction; and
retrieving the data comprises retrieving the data from within the point of presence.

20. The non-transitory computer readable medium of claim 19, wherein:
receiving the user input from within the point of presence comprises receiving the user input from within a secure container; and
retrieving the data from within the point of presence comprises retrieving the data from within the secure container.

21. The non-transitory computer readable medium of claim 20, further comprising instructions stored thereon, that when executed by a processor:
detect intrusion of a host of the local data store in the secure container; and
responsive to detection of the intrusion, transmit notification of the intrusion to the user.

22. A system for storing data, the system comprising:
a data store configured to receive data to be stored, wherein the data comprises a plurality of indexed fields;
a local data store in a jurisdiction, configured to store the data;
a router; and
a processor configured to:
determine whether the data is regulated in the jurisdiction;
responsive to determining that the data is regulated in the jurisdiction, select a storage scheme from a group consisting of:
a regulated storage scheme, requiring that the data be stored in the jurisdiction in accordance with one or more laws pertaining to the jurisdiction; and
an unregulated storage scheme, in which the data is not required to be stored in the jurisdiction and/or is not required to be stored in accordance with one or more laws; and
responsive to selection of the regulated storage scheme, follow the regulated storage scheme by:
encrypting the data;
causing the router to route the encrypted data to the local data store in the jurisdiction, in accordance with the one or more laws; and
causing the local data store to store the data;
wherein encrypting the data comprises:
using a SHA-256 hash to encrypt the indexed fields; and
using AES-256 symmetric encryption to encrypt the data.

23. The system of claim 22, wherein:
the data is owned by a first owner; and
encrypting the data comprises using a first encryption scheme;
and wherein the processor is further configured to:
encrypt second data, owned by a second owner different from the first owner, using a second encryption scheme different from the first encryption scheme; and
cause the router to route the second data.

24. The system of claim 22, wherein:
the system further comprises a second local data store; and
the processor is further configured to:
cause the router to further route the data to a second local data store in the jurisdiction; and
cause the second local data store to store the data.

25. The system of claim 22, further comprising:
a router;
an input device configured to receive user input from a user after storage of the data; and
an output device;
and wherein:
responsive to receipt of the user input:
the router is configured to retrieve the data using a hashed key of the SHA-256 hash;
the processor is configured to decrypt the data using an encryption key of the AES-256 symmetric encryption; and
the output device is configured to output the data.

26. A system for storing data, the system comprising:
a data store configured to receive data to be stored;
a local data store in a jurisdiction, configured to store the data;
a router;
a processor configured to:
determine whether the data is regulated in the jurisdiction;
responsive to determining that the data is regulated in the jurisdiction, select a storage scheme from a group consisting of:
a regulated storage scheme, requiring that the data be stored in the jurisdiction in accordance with one or more laws restricting transmission of the data out of the jurisdiction; and
an unregulated storage scheme, in which the data is not required to be stored in the jurisdiction and/or is not required to be stored in accordance with one or more laws;
responsive to selection of the regulated storage scheme, follow the regulated storage scheme by:
causing a router to route the data to the local data store in the jurisdiction, in accordance with the one or more laws; and
causing the local data store to store the data;
an input device located in the jurisdiction, configured, after storage of the data, to receive user input from a user via a web browser; and
an output device;
wherein:
the processor is further configured to, responsive to receipt of the user input, retrieve the data from the local data store; and the output device is configured to use a domain overlay to output the data via the web browser.

27. The system of claim 26, wherein the processor is further configured to select the regulated storage scheme by executing a software developer kit (SDK) method call of an API stored at least partially on the data store.

28. The system of claim 26, wherein the processor is further configured to encrypt the data, prior to initiating storage of the data, without storing a key for decrypting the data on the data store.

29. The system of claim 26, wherein:
receiving the user input comprises receiving the user input from within a point of presence within the jurisdiction; and
retrieving the data comprises retrieving the data from within the point of presence.

30. The system of claim 29, wherein the processor is further configured to:
receive the user input from within the point of presence by receiving the user input from within a secure container; and
retrieve the data from within the point of presence by retrieving the data from within the secure container.

31. The system of claim 30, wherein the processor is further configured to:
detect intrusion of a host of the local data store in the secure container; and
responsive to detection of the intrusion, transmit notification of the intrusion to the user.

* * * * *

UNITED STATES PATENT AND TRADEMARK OFFICE
CERTIFICATE OF CORRECTION

PATENT NO. : 11,615,193 B2  
APPLICATION NO. : 16/854799  
DATED : March 28, 2023  
INVENTOR(S) : Peter Yared et al.

Page 1 of 1

It is certified that error appears in the above-identified patent and that said Letters Patent is hereby corrected as shown below:

On the Title Page

• Item (72) Inventors: please replace "San francisco, CA" with --San Francisco, CA--

In the Claims

• Column 15, Line 11: (Claim 3): please replace "data for the user via the web browser" with --data via the web browser--

• Column 15, Line 37 (Claim 9): please replace "The method of claim 5, wherein" with --The method of claim 3, wherein--

Signed and Sealed this  
Twenty-third Day of May, 2023

Katherine Kelly Vidal  
*Director of the United States Patent and Trademark Office*